Sept. 22, 1959   W. CASTEDELLO ET AL   2,905,050
MOTORIZED VIEWING DEVICE FOR MOVIE FILMS
Filed July 22, 1953   6 Sheets-Sheet 1

INVENTORS
WILLIAM CASTEDELLO
EDWARD K. KAPRELIAN
RALPH MAYER
BY
ATTORNEY

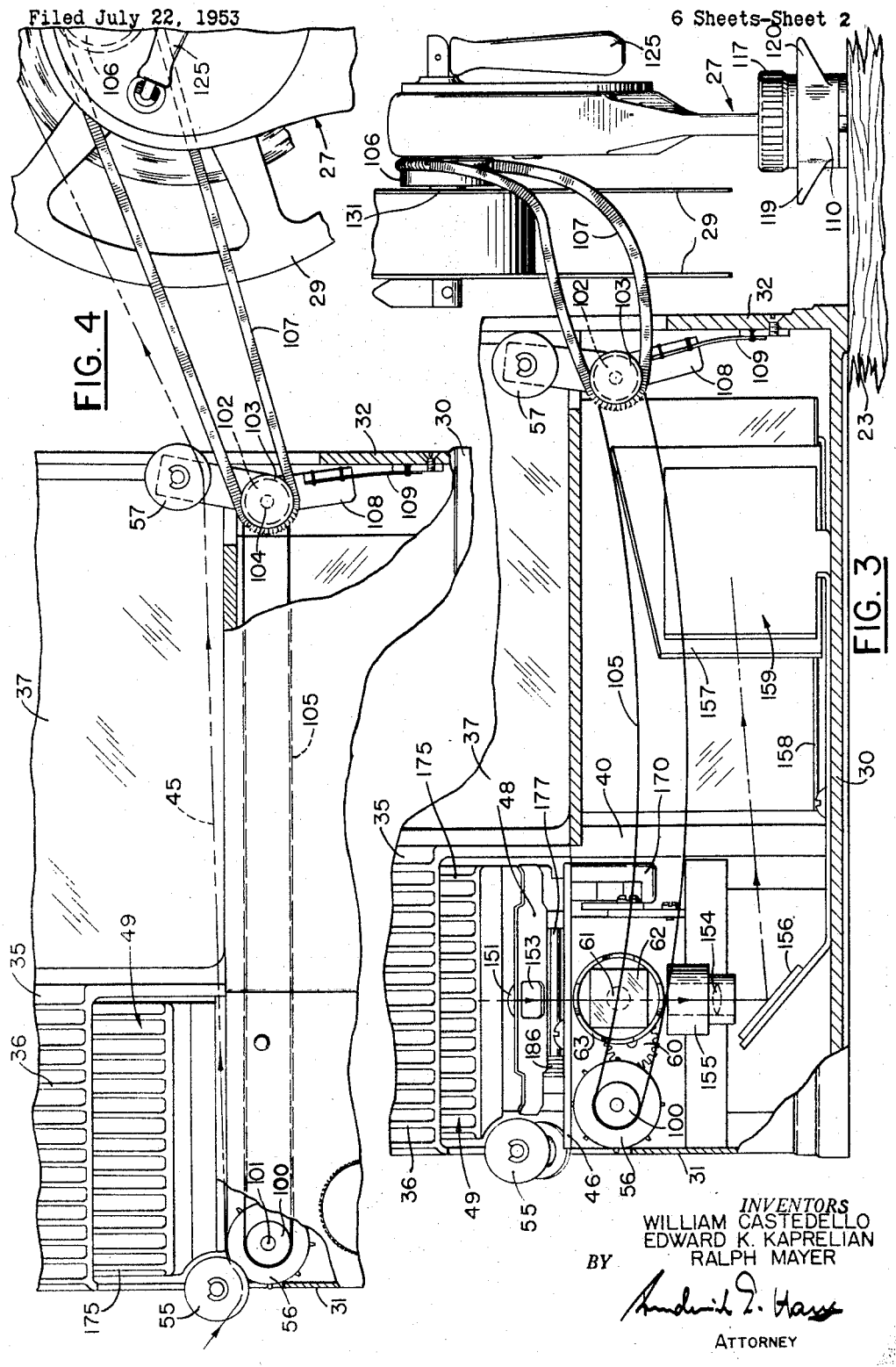

Sept. 22, 1959      W. CASTEDELLO ET AL      2,905,050
MOTORIZED VIEWING DEVICE FOR MOVIE FILMS
Filed July 22, 1953      6 Sheets-Sheet 3

*INVENTORS*
WILLIAM CASTEDELLO
EDWARD K. KAPRELIAN
RALPH MAYER
BY
ATTORNEY

Sept. 22, 1959     W. CASTEDELLO ET AL     2,905,050
MOTORIZED VIEWING DEVICE FOR MOVIE FILMS Filed July 22, 1953                                    6 Sheets-Sheet 4

INVENTORS
WILLIAM CASTEDELLO
EDWARD K. KAPRELIAN
RALPH MAYER
BY

ATTORNEY

Sept. 22, 1959  W. CASTEDELLO ET AL  2,905,050
MOTORIZED VIEWING DEVICE FOR MOVIE FILMS
Filed July 22, 1953  6 Sheets-Sheet 5

INVENTORS
WILLIAM CASTEDELLO
EDWARD K. KAPRELIAN
RALPH MAYER
BY
ATTORNEY

Sept. 22, 1959 W. CASTEDELLO ET AL 2,905,050
MOTORIZED VIEWING DEVICE FOR MOVIE FILMS
Filed July 22, 1953 6 Sheets-Sheet 6

INVENTORS
WILLIAM CASTEDELLO
EDWARD K. KAPRELIAN
RALPH MAYER
BY
ATTORNEY

United States Patent Office 2,905,050
Patented Sept. 22, 1959

2,905,050

MOTORIZED VIEWING DEVICE FOR MOVIE FILMS

William Castedello, Edward K. Kaprelian, and Ralph Mayer, Plainville, Conn.

Application July 22, 1953, Serial No. 369,574

5 Claims. (Cl. 88—16.8)

The present invention relates to a film viewing device, more particularly to a device for making viewable consecutive frames of a movie film on a viewing or observation screen.

One object of the present invention is to provide a viewing device of the general kind above referred to, in form of a compact portable demonstration unit which permits conveniently to show films exhibiting industrial and other products or dealing with scientific and educational subjects. The device also, of course, permits to show films pertaining to more general topics.

A more specific object of the invention is to provide a demonstration unit as above referred to, all the components of which including the feed reel and the take-up reel can be fitted in a comparatively small carrying case, the total weight of the unit permitting a convenient transportation of the same. The carrying case may also be used to carry therein spare parts for the device.

Another object of the invention is to provide a novel and improved viewing device of the general kind above referred to, including control means which permit by a single operation to switch on the light unit of the device and to place the respective components thereof either in the position for transport of a film through the device or to switch off the light unit and to place the said components in the position for insertion or removal of a film.

Still another object of the invention is to provide in a viewing device of the general kind above referred to, an electric motor drive coupled with the film transport means and with fan means by a coupling means which is controllable by control means so that the motor drive is turned on and either coupled for driving the film transport means and the fan means or the fan means only. The same control means also permit to shut off the motor drive.

A further object of the present invention is to provide a viewing device of the general kind above referred to, in which the film transport means driven by the aforesaid motor drive are coupled with the take-up and rewinding reel of the device by transmission means permitting to place the said reel either in an operative position for feeding the film through the device or rewinding the film, or in a position in which the reel fits in the aforesaid carrying case without requiring an assembly or disassembly of the transmission means.

In the accompanying drawings a now preferred embodiment of the invention is shown by way of illustration and not by way of limitation.

In the drawings:

Fig. 3 is a fragmentary view of the viewing device, partly in section, the take-up and rewinding reel of the device being placed in the position in which the carrying case may be closed.

Fig. 4 is a front view similar to Fig. 3 but showing the said reel in its operational position.

Figure 1:
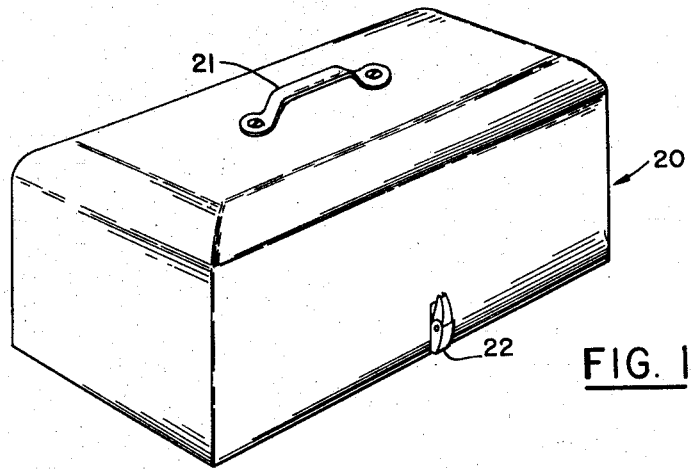
Fig. 1 is an isometric view of the carrying case in which the viewing device is fitted when not in use.
Figure 2:
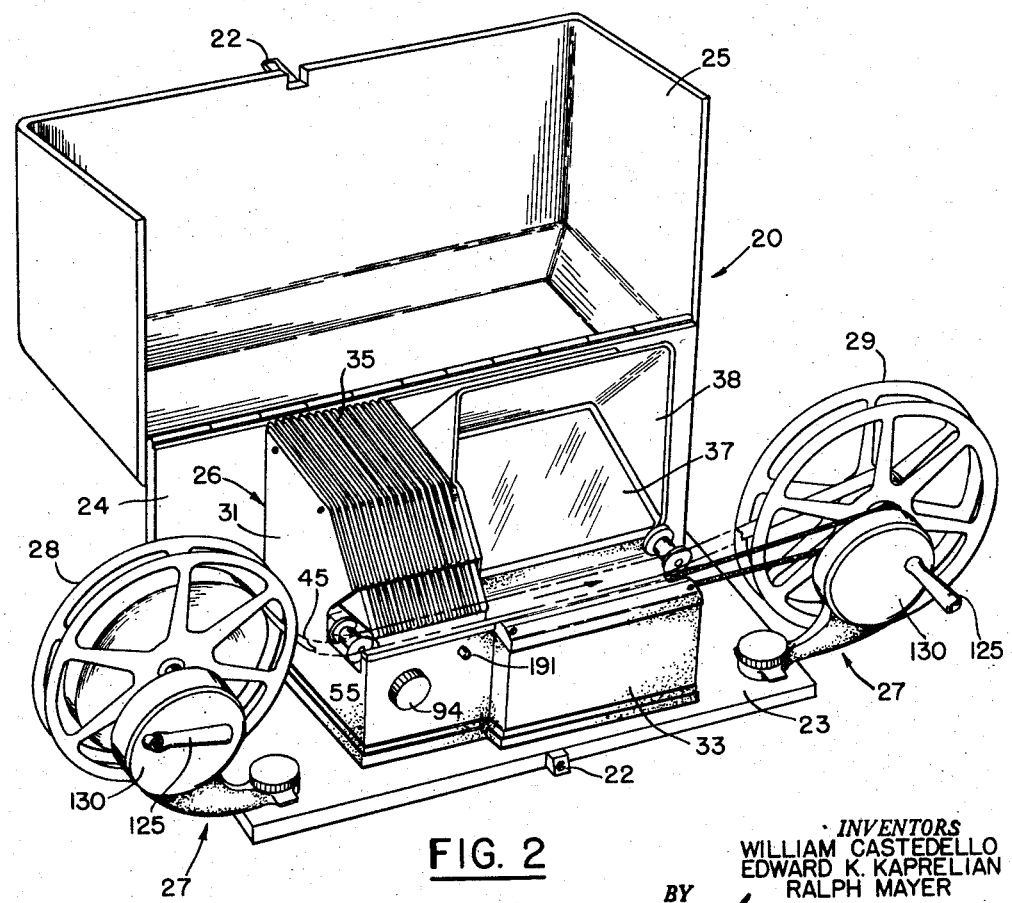
Fig. 2 is an isometric view of the viewing device ready for use, the carrying case being opened.

Referring now to the figures in detail, the viewing device, when ready for storage or transportation, appears as shown in Fig. 1 and, when readied for use, as shown in Fig. 2. As illustrated in Fig. 1, the viewing device proper and the reels associated therewith are housed in a carrying case 20 preferably of generally rectangular shape when closed. The casing may be provided with a handle 21 and a lock 22 of any suitable design.

Casing 20 when opened into the position of Fig. 2 reveals a base plate 23, a rear wall 24 and a cover 25 hinged to rear wall 24. The viewing device 26 proper is secured by any suitable means such as screws to base plate 23 and is disposed with its rear wall spaced a small distance from rear wall 24 of the casing to permit ventilation of the lamp to be described later on. Base plate 23 also provides space for the support arms 27 for the feed reel 28 and the take-up and rewind reel 29 respectively. Arms 27 occupy the positions shown in Fig. 2 when ready for use but may be pivoted into positions alongside the respective side walls of viewing device 26 as will be more fully explained hereinafter, to accommodate support arms within the space defined by the casing, more specifically by the cover 25 thereof. This cover may also be used to mount support hooks for the connecting cord of the viewing device and to store spare parts such as a spare lamp.

The viewing device 26 comprises as basic components rotary optical means including shutter means for producing standing images of successive frames of a movie film, a viewing screen, light beam reflecting means for reflecting the image representing light beams emanating from the optical means to the viewing screen, a light unit for directing a beam of light through optical means, film guiding means disposed between the light unit and the optical means for guiding successive frames of a film in front of the optical means, film transport means for continually moving a film through the device, a motor drive for driving the film transport means and the optical means control means for controlling the motor drive and control means for controlling the light unit. The device preferably includes fan means rotated by the motor drive.

The viewing device will now be described in detail.

All the aforesaid components of the device are mounted in or on a casing. This casing comprises a bottom wall 30, side walls 31 and 32 respectively, a front wall 33, a rear wall 34 and a cover 35. The left hand part of cover 35 is preferably slanted and provided with cooling fins or ribs 36 as it covers the part of the casing within which the heat producing components of the viewing device are located as will be more fully explained hereinafter. The right side of the cover is formed with a substantially rectangular opening in which is inserted the viewing screen 37, generally a glass or plastic plate frosted on one side. A hood 38 raised from the cover serves to facilitate the observation of images appearing on the viewing screen. The screen preferably rests within the casing upon a support frame formed by a partition wall 40 which also prevents light from leaking from the lamp into the viewing screen compartment.

Sidewall 31, rear wall 34 and cover 35 are preferably detachably mounted on the bottom wall 30 and on each other respectively to facilitate assembly and disassembly of the components within the casing. The said walls and the cover may be secured to each other by screws, guide flanges and similar means well known for the purpose.

For the purpose of guiding a film 45 to be shown on screen 37 and holding the film in proper position relative to the optical means, a plate 46 is provided formed with a track groove 47. This plate or more specifically the track groove therein coacts with a pressure or counter plate 48 which is yieldably supported on a pivotal member generally designated by 49. Spring 50 coacting with slidable studs 51 may be provided for this purpose. Track groove 47 and counter plate 48 may either occupy the relative position of Fig. 5 in which film 45 is held in the groove, that is, the film is in its operational position or the position of Fig. 6 in which track groove 47 and counter plate 48 are moved apart thereby making space available for insertion or removal of a film. The film is further guided when in operational position between a guide roll 55 and a sprocket 56 and by a guide roll 57. All three guide means are preferably provided with peripherally grooved end flanges to accommodate a sound track on the film. Guide roll 55 is mounted on pivotal member 49 to pivot the said roll in unison with member 49. When this member is placed in the position of Fig. 5, roll 55 occupies the position of Fig. 4 in which it coacts with sprocket 56 to hold the film between them and when member 49 is in the position of Fig. 6 the two guide means are sufficiently spaced apart to permit the insertion or removal of the film as is clearly shown in Fig. 3. The sprocket teeth of sprocket 56 are engageable with the sprocket holes in the film for accurately controlling the continual movement of the latter. The sprocket wheel is operatively coupled by a gear train, of which gear 60 only is shown, or by any other suitable means with a shaft 61 upon which the image-producing optical means and the shutter means are also seated. These means are of conventional design so that a detailed description of these means is not essential for the understanding of the invention. They are shown as comprising a polygonal prism 62 such as a square prism rotatable together with shaft 61. The shutter means are shown as a sleeve 63 also rotatable together with shaft 61. This sleeve is mounted coaxially with prism 62 and formed with four axial slots each facing one of the four square sides of the prism as can best be seen in Fig. 3. The remaining wall portions of the sleeve face the four corners of the prism so that the sleeve constitutes the obturator of a shutter. As is well known, the obturator serves to black out the frame lines between each two frames when the obturator and the prism are driven at an appropriate rate of speed relative to the movement of the film thereby producing images on the screen which are stopped frame by frame in spite of a continuous film movement.

For the purpose of rotating prism 62 with obturator sleeve 63, sprocket wheel 56 coupled therewith and also the take-up and rewind reel 29, a motor drive in form of an electric motor is provided. This motor comprises an armature in form of a generally horseshoe shaped laminated iron core 65, a field winding 66 encompassing the bight of the core and a rotor 67. Field winding 66 is mounted in an insulation frame 68 which also serves to fasten the entire motor on the bottom wall 30 of the casing by any suitable means. Rotor 67 is mounted in bearings 69 and 70 respectively preferably of the self-lubricating type. The drive shaft 71 of the motor has seated thereon a milled or knurled drive wheel 72 and preferably also a fan 73 which serves to dissipate the heat generated by the motor and the light unit of the device. Drive wheel 72 coacts with a wheel 74 which has preferably a rough surface such as a rubber surface. Wheel 74 is seated on one end of a shaft 75 the other end of which supports a second knurled or milled wheel 76. Shaft 75 is journaled in a support block 77 which in turn is fixedly seated upon a rod 78. Rod 78 is rotatably and slidably supported in a bore of a support plate 79 secured to core 65 by a bracket 80 secured to the core by any suitable means such as screws 81. Plate 79 is further supported by a heavy post or block 82 secured to the bottom 30 of the casing. The plate 79 is slotted at 83.

Figure 9:
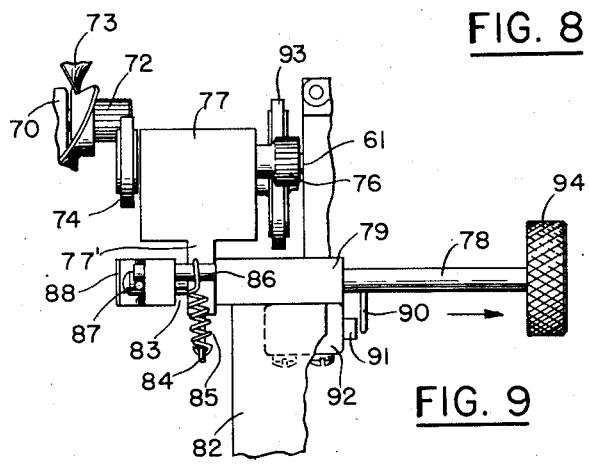
Fig. 9 is a schematic elevational view of part of the motor drive and its control means.
Figure 10:
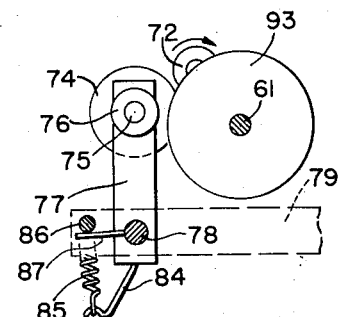
Fig. 10 is a diagrammatic side view of Fig. 9.
Figure 11:
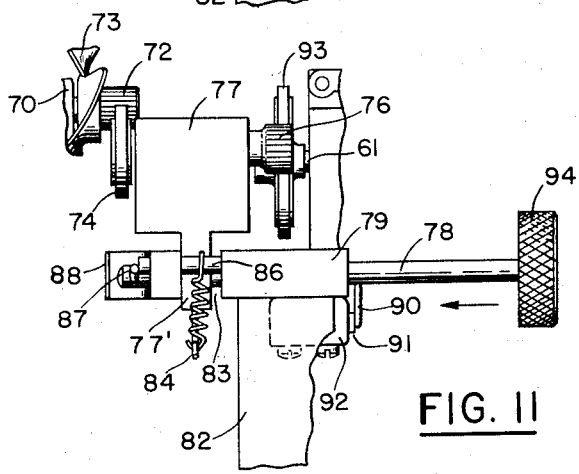
Fig. 11 is a view similar to Fig. 9 but showing the motor drive and its control means in a different operational position.

As can best be seen in Figs. 9 to 12 which show the essential components only of the motor control means now being described, block 77 is seated on rod 78 by means of an extension 77' extending into slot 83. A hook or nose 84 extending from this extension holds one end of a loaded spring 85 the other end of which is attached to a pin 86 extending across slot 83 in plate 79. The ends of rod 78 and of pin 86 protrude from the left hand side of plate 79 as can best be seen in Figs. 9 and 11. Rod 78 has thereon a pin or nose 87 coacting with the protruding end of pin 86. A leaf spring 88 secured to plate 79 by a screw 89 presses against the end of rod 78 thereby biasing the rod toward the right as seen in Figs. 9 and 11.

Rod 78 supports a second pin or nose 90 coacting with the switch button 91 of a miniature snap switch 92 as known under the trademark "Microswitch." This switch is mounted on the bottom side of plate 79. It controls the energizing circuit of the motor, and its switch button is so set that the circuit is closed when the button is depressed by nose 90.

Knurled wheel 76 on shaft 75 coacts with a wheel 93 which is seated on the shaft 61 of prism 62 and obturator sleeve 63. Wheel 93 preferably has also a rough surface such as a rubber surface.

As will appear from the previous description and an analysis of the figures, particularly of Figs. 9 to 12, the just-described wheels and shafts constitute a power transmission between motor shaft 71 and shaft 61, wheel 72 being the input wheel and wheel 93 being the output wheel of the transmission.

For purpose of manipulating rod 78, a knurled knob 94 is mounted on this shaft. The position of the knob can best be seen in Fig. 2.

Figure 12:
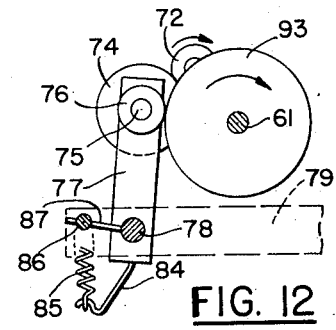
Fig. 12 is a schematic side view of Fig. 11 similar to Fig. 10.

The operation of the motor and its control means, as hereinbefore described, is as follows. Let it be assumed that the components of the motor control occupy the position of Figs. 9 and 10. In this position, pin 87 is disengaged from the face end of pin 86 and spring 88 presses against the face end of rod 78 thereby pushing the same toward the right until stopped by pin 87 abutting against the side edge of plate 79. As a result, pin 90 is disengaged from switch button 91. Furthermore, the abutment of pin 87 against the protruding end of pin 86 retains block 77 against the action of spring 85 in a position in which wheels 74 and 76 are both separated from the respective wheels 72 and 93. When it is now desired to start the motor, knob 94 is pushed slightly inwardly against the action of leaf spring 88. As a result, pin 87 is moved out of engagement with the retaining end of pin 86 and spring 85 can turn block 77 slightly in clockwise direction as seen in Figs. 10 and 12. As a result, the components of the motor control occupy the positions shown in Figs. 11 and 12 in which wheel 74 is in frictional engagement with wheel 72 and wheel 76 is in engagement with wheel 93. Pin 87 rests against the face end of pin 86, and pin 90 is moved into a position in which it presses switch button 91 into its circuit closing position. Consequently, the motor is started and drives fan 73 directly and prism 62 and obturator 63 through the aforedescribed transmission. The rotation of shaft 61 is transmitted through the aforementioned gear train including gear 60 to sprocket wheel 56 so that the same is also rotated for purpose of providing a continual movement of the film through the device.

To stop the motor, knob 94 is slightly turned in counter-clockwise direction (as seen in Fig. 2) until pin 87 clears the face of pin 86. Spring 88 acting upon the face of rod 78 now presses the rod toward the right and into the position of Fig. 9. As a result, pin 90 releases switch button 91 and block 77 occupies the position of Fig. 9 in which coacting wheels 72, 74 and 76, 93 are disengaged from each other and in which the block is held by pin 87 abutting against the protruding end of pin 86.

With viewing devices of the kind here involved, it is or may be desirable to rotate the cooling fan 73 without simultaneously rotating the prism and the film drive. This may be accomplished by pushing rod 78 inwardly into the position in which the motor circuit is closed by switch button 91 while simultaneously holding knob 94 so that rod 78 and with it block 77 cannot be rotated into the position in which the aforementioned coacting driving and driven wheels are in engagement. Consequently, the motor will drive the fan but not shaft 61.

The drive for the take-up and rewind reel 29 is derived from shaft 61 or more specifically from sprocket wheel 56. To this end, a pulley 100 is seated on the shaft 101 of sprocket wheel 56 and two pulleys 102 and 103 are fixed on a shaft 104 in axial alignment with each other. Rotation is transmitted from pulley 100 to pulley 102 by a driving belt 105 and from pulley 103 to a pulley 106. This pulley serves as film transport means and is mounted on reel support arm 27 for rotation of reel 29 by an elastic belt such as a coiled wire 107. Shaft 104 on which the pulleys 102 and 103 are seated is mounted on a bracket or arm 108 also rotatably supporting guide roll 57. Bracket 108 is secured to the right hand side wall 32 of the casing by a leaf spring 109 which biases bracket 108 and with it the pulleys supported thereon into the position of Fig. 3 in which driving belt 105 is slack so that no rotation can be transmitted from pulley 100 to pulley 102.

As was previously mentioned and will be more fully explained hereinafter, support arm 27 of reel 29 can be pivoted either into the position of Fig. 3 which is the position for closing the carrying case or into the position of Fig. 4 which is the operational position of the reel. In the position of Fig. 3 driving coil 107 is slack so that bracket 108 will occupy the position in which driving belt 105 is also slack. When now arm 27 is pivoted into the position of Fig. 4, transmission coil 107 is tensioned thereby forcing bracket 108 and with it the pulleys thereon into the position of Fig. 4 in which driving belt 105 is tensioned. As a result, a rotation of pulley 100 will be transmitted to pulley 106. As appears from the previous description, support arm 27 can be moved into either one of its two positions without assembling or disassembling any part of the transmission.

To permit pivoting of either reel support arm 27 through the required angle of 90°, each arm ends in a pivot sleeve 110 journaled upon a pivot stud 111 secured to base 23 of carrying case 20. The stud is formed with a flange 112 including two notches 113 and 114 circumferentially spaced by an angle of 90°. These notches coact with a locking pin 115 depending from pivot sleeve 110. Accordingly, arm 27 and with it the respective reel may be placed either in the operational position of Fig. 2 or Fig. 4 by engagement of pin 115 with notch 114 or in a position substantially parallel to the respective side wall of the casing of the device by turning arm 27 into the position in which pin 115 engages notch 113. Arm 27 is preferably held in its position upon and relative to stud 111 by a screw 116 with a knurled head 117. A washer 118 may be interposed between screw head 117 and pivot sleeve 110. To facilitate lifting of arm 27 into a position in which pin 115 clears the respective notch 113 or 114, grips or lugs 119 and 120 may laterally extend from pivot sleeve 110.

Figure 18:
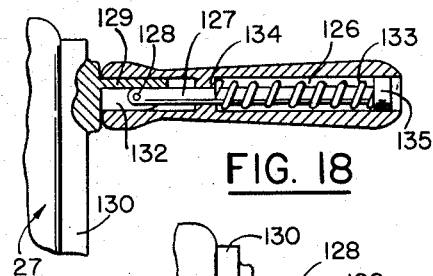
Fig. 18 is a section similar to Fig. 17 but showing the reel handle in operational position.
Figure 17:
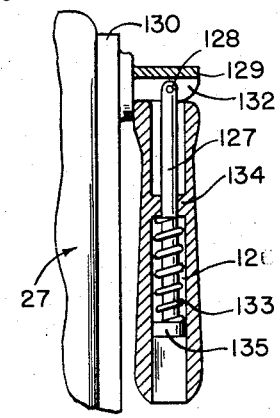
Fig. 17 is a section taken on line 17—17 of Fig. 16, the reel handle being folded.

To further reduce the overall dimensions of carrying case 20, handles 125 for manually rotating the reels are pivotally mounted so that they may be swung either into the position as shown in Fig. 2 in connection with the reel 28 or into the operative position as shown in connection with reel 29. To this end, each handle 125 is provided with an axial bore 126 in which a rod 127 is slidably guided. The end of the rod facing the reel is pivoted at 128 to a mounting post 129 secured to a drum 130 rotatably mounted on support 27 for rotating the reel shaft 131 on which pulley 106 is also seated. Mounting post 129 is formed with an axial slot 132 so that rod 127 and with it handle 125 can occupy either the position of Fig. 17 or the position of Fig. 18. A spring 133 biased by abutting against a shoulder 134 and a collar 135 at the end of rod 127 urges the handle either into the position of Fig. 17 or the position of Fig. 18. When it is desired to pivot the handle from the position of Fig. 17 into the position of Fig. 18, the handle and with it rod 127 are simply swung upwardly. As soon as the respective edge of the handle clears the forward edge of mounting post 129, the rounded forward edge of the post facilitating such swinging movement of the handle, spring 133 will pull the handle into the position of Fig. 18 in which it is rigidly held by post 129 for manual rotation of the reel. To return the handle into the position of Fig. 17, the handle is pulled away from its support against the tension of spring 133 until the respective end of the handle again clears post 129 whereupon the handle can be swung into the position of Fig. 17.

The light unit of the viewing device is shown as a conventional projection lamp 140 having a bayonet base. A corresponding socket 141 for the light bulb is mounted on support plate 79. The socket has two bottom terminals 142 and 143 which are extended through plate 79 as can best be seen in Fig. 5. These terminals as well as the terminals for the motor drive are connected to their respective switches and with a suitable source of current by a connecting cord. The terminals are preferably separated by an insulation plate 144. The motor circuit should be visualized as being conventional so that a circuit diagram is not essential for the understanding of the invention.

A shield 145 is fitted upon light bulb 140 and yieldably secured thereto by flexible prongs or other suitable means. A second shield 146 reaches over fan 73 and is secured to the armature core 65 by screws 147 which also secure motor bearing 70 to the armature core. The two shields serve to protect the film from the heat generated by the lamp and the motor and to direct the air flow produced by fan 73 respectively. They also serve to prevent stray light within the compartment from reaching the viewing screen and from being visible outside the device.

Figure 13:
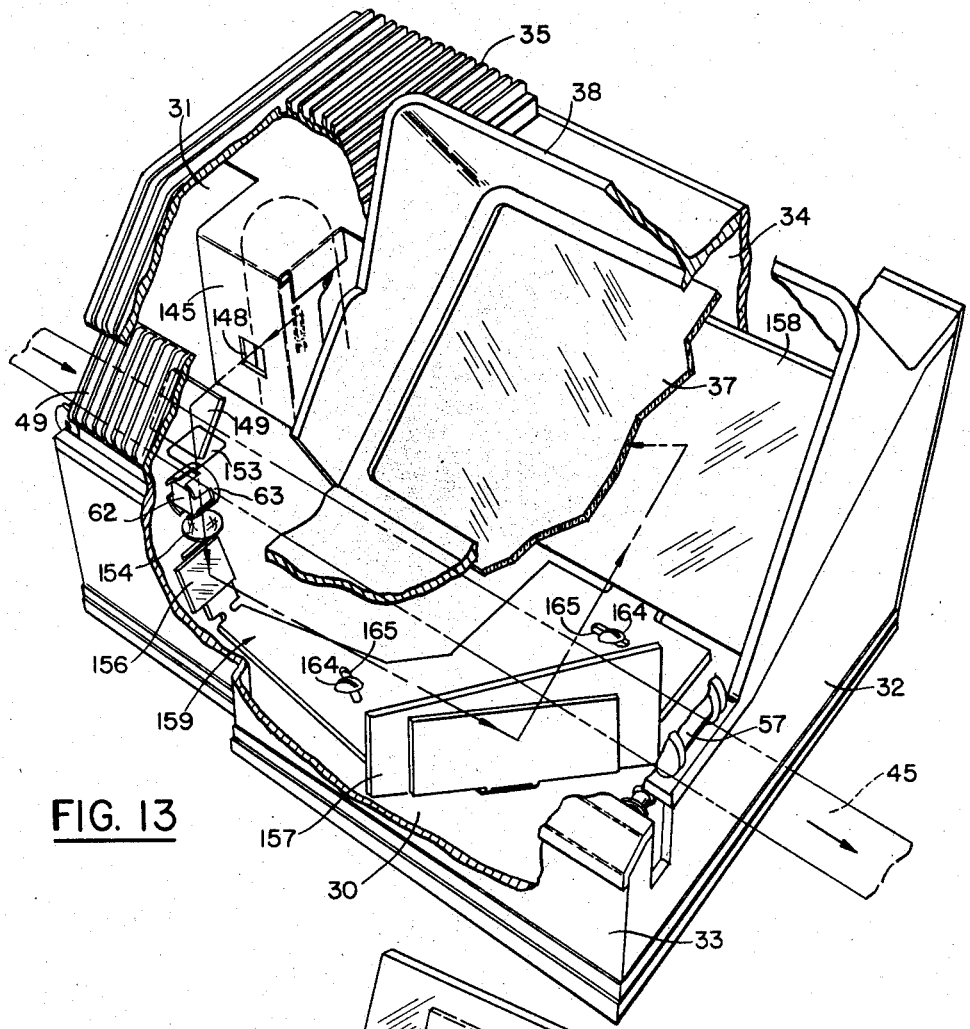
Fig. 13 is a fragmentary isometric view of Fig. 2 showing the light beam reflecting means of the viewing device in detail.
Figure 14:
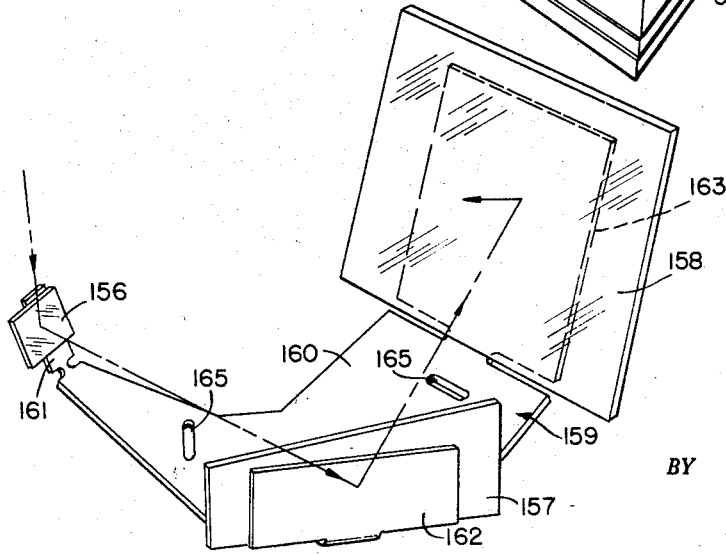
Fig. 14 is an isometric view of the assembly of the light reflecting means proper.
Figure 15:
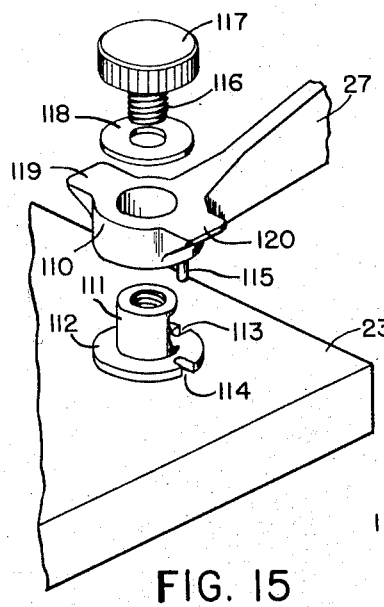
Fig. 15 is an isometric detail view of the support means for a reel of the viewing device.
Figure 16:
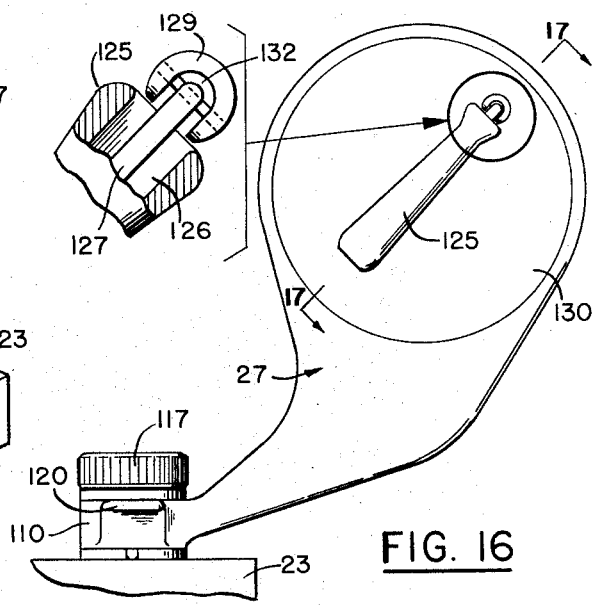
Fig. 16 is a detail view of one of the reel assemblies of the viewing device.

A beam of the light produced by the light bulb is projected through a gate 148 in shield 145 to a mirror 149 secured to a wall 150 of pivotal member 49. The mirror projects the light beam through a condenser lens 151 fitted in a grooved aperture in a bottom wall 152 of member 49, a window 153 in pressure plate 48, a film guided between the pressure plate 48 and guide track 47, prism 62, and a projection lens 154 fitted in a lens barrel 155 to a mirror 156. Lens 154 which images the film on the screen is preferably adjustably mounted to permit a focal adjustment of the image. Mirror 156 constitutes a component of a mirror assembly which can best be seen in Figs. 13 and 14. It comprises, in addition to mirror 156, a mirror 157 and a mirror 158. This last mirror reflects the images upon the viewing screen as is indicated in Fig. 14 by the arrows.

The three mirrors 156, 157 and 158 are mounted on a common frame generally designated by 159. This frame has a flat base portion 160 from which are bent up three prongs 161, 162 and 163 which support the mirrors. The frame or at least the portion thereof joining the prongs with the base are preferably made of comparatively easily bendable material so that the mirrors may be conveniently adjusted relative to each other and to the viewing screen by bending the prongs accordingly. The frame is releasably attached to bottom wall 30 of the casing by screws 164 threaded through elongated slots 165 in frame portion 160 thereby permitting a further adjustment of the mirrors.

As appears from the previous description, the mirror assembly can be mounted within the casing and removed therefrom as a sub-assembly thereby facilitating the final assembly of the device and any repairs thereof.

The energizing circuit of bulb 140 is controlled by a second miniature snap switch 170 having a switch button 171. The switch 170 is mounted on plate 79 on the top side thereof. Switch button 171 is again so set that the switch interrupts the lamp circuit controlled by it when the button is released. The switch is controlled by the pivotal position of member 49. It is closed when this member is in the position of Fig. 5 and opened when it is in the position of Fig. 6.

Member 49 and the components associated therewith are disposed within a gap formed in the left hand portion of casing cover 35. It has a substantially triangular cross-section and its slanted wall 150 forms substantially a continuation of the corresponding portion of casing cover 35 when member 49 is in the position of Fig. 5. Wall 150 is preferably provided with cooling ribs or fins 175 similar to the cooling fins 36.

Figure 5:
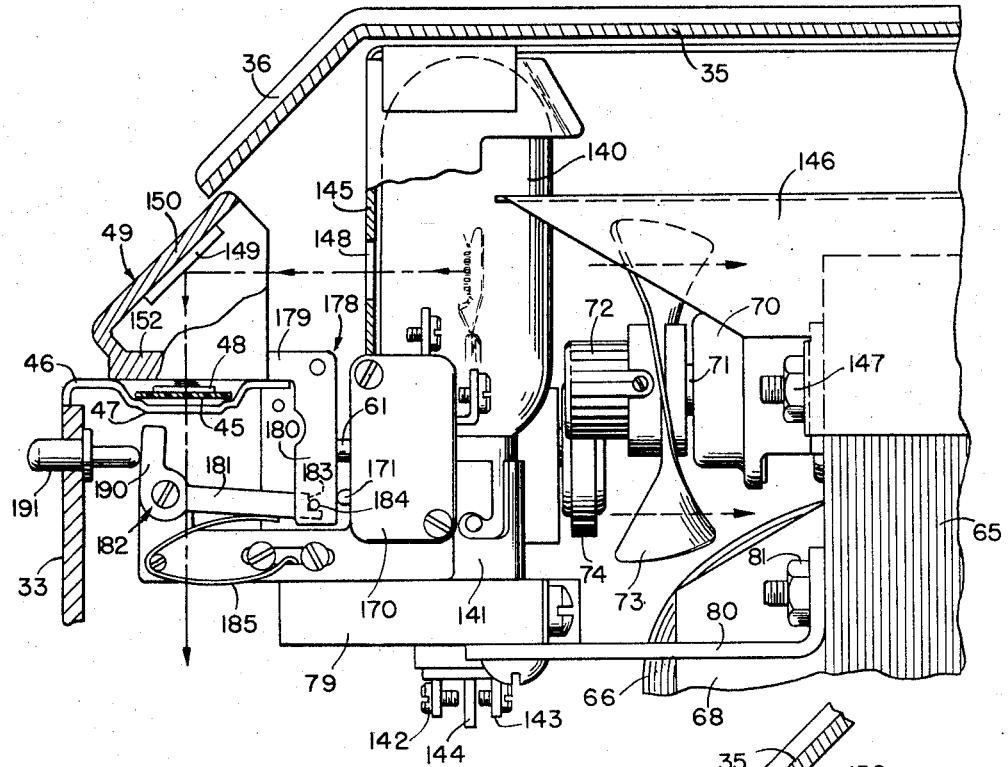
Fig. 5 is a fragmentary, partly sectional view of the motor drive and the control means for controlling the film transport means and the light unit of the device.
Figure 6:
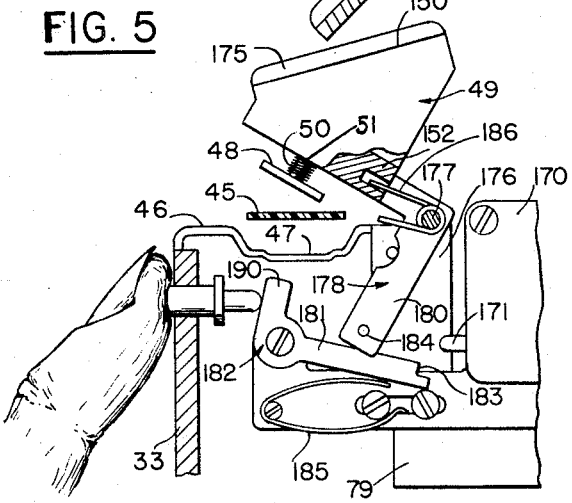
Fig. 6 is a fragmentary, partly sectional view of the control means of Fig. 5 in a different position.
Figure 7:
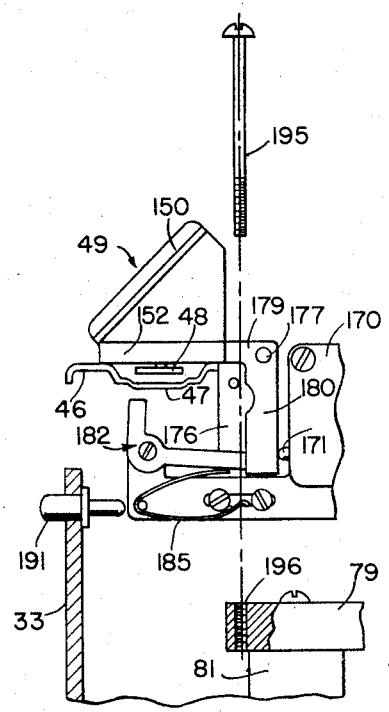
Fig. 7 is another view of the said control means, showing that the same are mounted as a subassembly unit.
Figure 8:
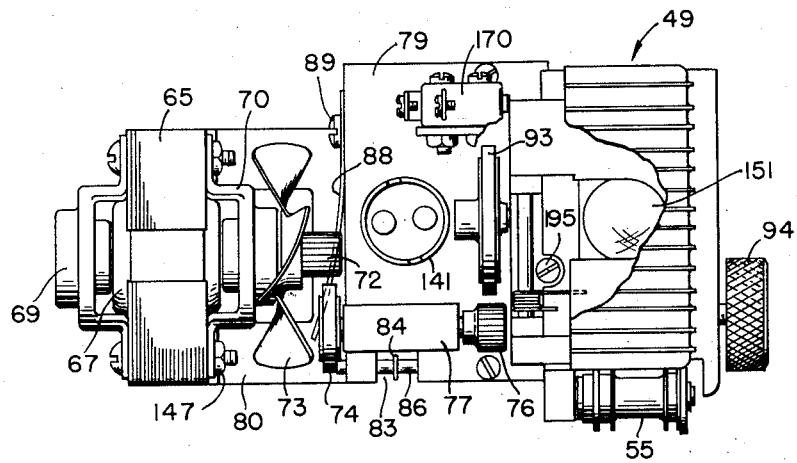
Fig. 8 is a fragmentary top view of Fig. 5 in detail showing the motor drive and control means therefor.

The triangular member is pivoted to a support block or post 176 by means of a pivot pin 177. For this purpose, bottom wall 152 of the member is provided with ears one of which is extended to form a two-arm lever 178 having an arm 179 secured to or integral with member wall 152 and an arm 180 for controlling the positions of switch button 171 and member 49. To this end, arm 180 coacts with an arm 181 of a second two-arm lever generally designated by 182 pivoted to an extension of block 176 supporting two-arm lever 178. The free end of lever 181 is formed with a shoulder 183 which coacts with a locking pin 184 on lever arm 180. In Fig. 5, pin 184 engages shoulder 183 thereby holding lever 178 in the illustrated position in which lever arm 180 presses against switch button 171 thereby closing the bulb circuit, pressure plate 48 holds film 45 in track groove 47 and mirror 149 is in the position for reflecting light beams as previously described, the slanted wall 150 of member 49 closing the gap in casing cover 35. In Fig. 6, pin 184 is disengaged from shoulder 183, lever arm 180 has released switch button 171 thereby opening the bulb circuit and pressure plate 48 is spaced apart from track groove 47 for inserting a film in the groove or removing the film therefrom.

A loaded spring 185 urges lever arm 181 toward engagement with lever arm 180 and a coil spring 186 on pivot pin 177 urges member 49 and the parts associated therewith into the position of Fig. 6.

For the purpose of pivoting lever arm 181 out of engagement with pin 184 on lever arm 180, the second arm 190 of lever 182 coacts with an actuating member shown as a button 191. This button extends slidably through the front wall 33 of the casing. As can best be seen in Figs. 5 and 6, a pressure exerted against the button will turn lever 182 slightly in a clockwise direction, thereby causing member 49 and with it lever 178 to pivot into the position of Fig. 6.

Member 49, support block 176 mounting levers 178 and 182, snap switch 170 and the other components associated therewith are preferably arranged in form of a self-contained sub-assembly which is mounted on support plate 79 by fastening means which can be easily assembled and disassembled such as a single screw 195 threaded in a bore 196 in support plate 79. This arrangement greatly facilitates the adaptation of the viewing device to films of different width for instance when it is desired to change from an 8 millimeter film to a 16 millimeter film.

The operation of the viewing device, as hereinbefore described, is as follows:

Let it be assumed that the carrying case 20 is closed which entails that the support arms of the two reels are in the position shown in Fig. 3 and that it is now desired to use the viewing device. For this purpose, the carrying case is opened and the two reels are swung into the operational position shown in Fig. 2. As a result, transmission belt 105 and transmission coil spring 107 are automatically tensioned to transmit a rotation of sprocket wheel 56 to reel 29. Button 191 is pressed whereby pivotal member 49 and the parts associated therewith move from the position of Fig. 5 into the position of Fig. 6. Film 45 initially wound upon reel 28 is now fitted between the guide rolls and attached to the take-up reel 29 in the conventional manner. Assuming that the device is connected to a power outlet, it can now be readied for showing of a film by pressing member 49 into the position of Fig. 5 which closes the lamp circuit and by starting the motor by pressing knob 94 toward the casing. As previously explained, such displacement of the knob causes closing of motor switch 92 and releases spring 85 for pivoting wheels 74 and 76 into engagement with the coacting wheels 72 and 93.

The motor is stopped by turning knob 94 slightly in counter-clockwise direction (as seen in Fig. 2) and retracting the knob from the casing. The lamp is turned off by again pushing button 191 which also moves member 49 and with it pressure plate 48 into the position for removal of the film.

In case it is desired merely to arrest the movement of the film while continuing rotation of the motor to obtain the cooling effect of the fan, knob 94 is slightly rotated in counter-clockwise direction, and held but not pulled outwardly. As a result, the motor switch remains closed but the coacting driving and driven wheels are separated.

To return the device into the position for closing of the carrying case, the support arm of both reels are folded back against the respective side walls of the casing, the flexibility of coil spring 107 permitting such turning of the arm for reel 29 without disassembly of the transmission means. Occasionally reels of such large size may be employed that they do not fit in the carrying case in which event they must be removed before the case can be closed.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A viewing device for movie films comprising in combination film guiding means for guiding film to be viewed through the device, the said guiding means being movable between a film guiding position and a film releasing position, an electric light unit for directing a beam of light through successive frames of film moved through the device, a viewing screen, light reflecting means optically interposed between the film guiding means and the viewing screen for reflecting images of successive frames upon the viewing screen, rotary optical means including shutter means disposed between said film guiding means and said light reflecting means for making viewable upon the viewing screen a sequence of standing images of successive frames of film continually moving through the device, film transport means for continually moving a film to be viewed through the device, electric motor drive means, transmission means for drivingly connecting the motor means with the optical means and the transport means to operate the said two means for the purpose aforesaid, releasable coupling means included in said transmission for controlling the connection and disconnection of the transmission means, light switch means controlling an energizing circuit for said light unit, first common control means coacting with the film guiding means for simultaneously releasing the latter for movement into the release position and controlling said light switch means, motor switch means controlling an energizing circuit for said motor means, second common control means for controlling said coupling means and also controlling said motor switch means, and fan means fixedly coupled with said motor means for rotation therewith and disposed for dissipating the operational heat generated by the light unit and the motor means, said second control means being selectively movable into a position closing said motor switch means and also controlling the coupling means to effect connection of the transmission means for rotating the optical means and driving the transport means and into a position closing said motor switch means and controlling the coupling means for disconnection of the transport means, thereby rendering the motor means operative for rotating said fan means only.

2. A viewing device according to claim 1, wherein the said transmission means comprise a train of driving and driven wheels, the input wheel of said train being mounted on the motor means and the output wheel on the optical means, and wherein said coupling means comprise at least one intermediate wheel of the train mounted movable between an operative position for transmission of movement and a stop position inoperative for the said purpose, and wherein said second control means comprise an actuating member coacting with said intermediate wheel for selectively moving the same into one of said two positions.

3. A viewing device according to claim 2, wherein said coupling means further comprise a pivotally mounted arm supporting the said intermediate transmission wheel, and wherein the said actuating member comprises a rotatable and axially slidable bar coacting with said support arm and said motor switch means respectively so that an axial displacement of said bar controls the opening and closing of said switch means and a rotation of said bar controls pivoting of the support arm for movement of the intermediate wheel into either one of its said two positions.

4. A viewing device according to claim 3, wherein loaded yieldable means urge the said support arm into a pivotal position in which the wheel thereon is in its operative position, and wherein releasable retaining means detain the said support arm in the pivotal position in which the said intermediate wheel is in its stop position, an axial displacement of the bar in one direction closing the motor switch means and releasing said retaining means for rotation of said bar by said yieldable means and axial displacement of the bar in the opposite direction opening said switch means and rendering said retaining means operative for the purpose aforesaid, said support arm being seated upon said bar for rotation in unison therewith, release of said retaining means by displacement of the bar in the respective direction causing a rotation of the bar for pivoting said intermediate wheel into its operative position, and yieldable means urging said bar into its axial position for opening the motor switch means and for moving said retaining means into the retaining position thereof.

5. A viewing device according to claim 4, wherein an actuating element extending from said bar is engageable with said motor switch means in one axial position of the bar for closing the motor switch means and disengaged therefrom in the other axial position of the bar for opening the motor switch means.

References Cited in the file of this patent

UNITED STATES PATENTS

| | | |
|---|---|---|
| 1,442,647 | Carter | Jan. 16, 1923 |
| 1,868,252 | Ponting et al. | July 19, 1932 |
| 1,894,963 | Proctor | Jan. 24, 1933 |
| 1,926,862 | Wellman | Sept. 12, 1933 |
| 1,944,032 | Ponting et al. | Jan. 16, 1934 |
| 2,046,723 | Brownscombe | July 7, 1936 |
| 2,067,893 | De Vry | Jan. 19, 1937 |
| 2,114,608 | Ross | Apr. 19, 1938 |
| 2,142,493 | Carpenter | Jan. 3, 1939 |
| 2,218,256 | Bechtel | Oct. 15, 1940 |
| 2,278,781 | Harrison | Apr. 7, 1942 |
| 2,343,850 | Fairbanks et al. | Mar. 7, 1944 |
| 2,354,679 | Frankel | Aug. 1, 1944 |
| 2,358,692 | De Vry | Sept. 19, 1944 |
| 2,381,997 | Bolsey | Aug. 14, 1945 |
| 2,419,339 | Dennis | Apr. 22, 1947 |
| 2,422,816 | Baia | June 24, 1947 |
| 2,576,586 | Frankel | Nov. 27, 1951 |